US012623419B2

(12) United States Patent
Gu et al.

(10) Patent No.: US 12,623,419 B2
(45) Date of Patent: May 12, 2026

(54) INSULATION FOAMING STRUCTURE AND METHOD FOR A TANK CONTAINER

(71) Applicants: NANTONG TANK CONTAINER CO., LTD., Nantong (CN); SQUARE TECHNOLOGY GROUP CO., LTD, Nantong (CN)

(72) Inventors: Hongfei Gu, Nantong (CN); Xiaobo He, Nantong (CN)

(73) Assignees: NANTONG TANK CONTAINER CO., LTD, Jiangsu (CN); SQUARE TECHNOLOGY GROUP CO., LTD, Jiangsu (CN)

( * ) Notice: Subject to any disclaimer, the term of this patent is extended or adjusted under 35 U.S.C. 154(b) by 207 days.

(21) Appl. No.: 18/543,698

(22) Filed: Dec. 18, 2023

(65) Prior Publication Data

US 2025/0091306 A1 Mar. 20, 2025

(30) Foreign Application Priority Data

Sep. 18, 2023 (CN) .......................... 202311205075.9

(51) Int. Cl.
| | |
|---|---|
| *B29D 22/00* | (2006.01) |
| *B65D 88/12* | (2006.01) |
| *B65D 90/06* | (2006.01) |
| *B29K 71/00* | (2006.01) |
| *B29K 105/04* | (2006.01) |
| *B29K 309/08* | (2006.01) |

(52) U.S. Cl.
CPC ......... *B29D 22/003* (2013.01); *B65D 88/128* (2013.01); *B65D 90/06* (2013.01); *B29K 2071/00* (2013.01); *B29K 2105/04* (2013.01); *B29K 2309/08* (2013.01)

(58) Field of Classification Search
None
See application file for complete search history.

(56) References Cited

FOREIGN PATENT DOCUMENTS

| | | |
|---|---|---|
| CN | 106865033 B | 2/2019 |
| CN | 115351976 A | 11/2022 |
| EP | 3 462 102 A1 | 4/2019 |

OTHER PUBLICATIONS

Machine Translation CN 115351976A.*

* cited by examiner

*Primary Examiner* — Christopher T Schatz
(74) *Attorney, Agent, or Firm* — Birch, Stewart, Kolasch & Birch, LLP

(57) ABSTRACT

A tank container insulation foaming structure comprising a press molding module and a clamping fixation module for securing the press molding module; the press molding module comprises a flat plate that connects with the tank container, an arc plate provided on the flat plate, and a connection plate for connecting the flat plate with the arc plate; a foaming space is formed between the arc plate and the tank container; the clamping fixation module comprises a fixed frame for securing the flat plate, a compression rod for fastening the fixed frame, and connecting components that connect the compression rod with the tank container; the fixed frame is connected to the press molding module and fastens the fixing frame to the tank container by the compression rod, the compression rod is connected to the tank container through connecting components; the foaming space has an insulating layer formed by the foaming material.

7 Claims, 3 Drawing Sheets

INSULATION FOAMING STRUCTURE AND METHOD FOR A TANK CONTAINER

TECHNICAL FIELD

The present invention relates to the field of insulation technology for tank containers, and particularly to an insulation foaming structure and method for such containers.

BACKGROUND

Most tank container types in the current industry have thermal insulation needs. Various insulation types, such as rock wool filling and PU board laying, are used. Conventional tank containers typically use rock wool filling material for insulation, suitable for mediums insensitive to environmental temperature. This method involves wrapping sheet rock wool insulation material around the cylinder and covering it with fiberglass outside, providing insulation during conventional steam heating processes of the container. However, for containers requiring higher insulation, this method does not achieve optimal insulation effects.

Foam insulation methods are used for higher insulation requirements, but the foaming process is complicated. The intense reaction of the foaming material can lift and damage the foaming mold, leading to leakage of the foaming material and inadequate insulation of the tank.

SUMMARY

The purpose of this invention is to solve the aforementioned issues by providing a tank container insulation foaming structure and method.

To achieve the above object, the present invention provided a tank container insulation foaming structure, comprising:

a press molding module for foaming; and a clamping fixation module for securing the press molding module;

wherein the press molding module comprises a flat plate that connects with the tank container, an arc plate provided on the flat plate, and a connection plate used to connect the flat plate with the arc plate: a foaming space is formed between the arc plate and the tank container;

wherein the clamping fixation module comprises a fixed frame for securing the flat plate, a compression rod for fastening the fixed frame, and connecting components that connect the compression rod with the tank container: the fixed frame is connected to the press molding module and fastens the fixing frame to the tank container by the compression rod, the compression rod is connected to the tank container through connecting components: the foaming space has an insulating layer formed by the foaming material.

As a further improvement of the present invention, wherein the flat plate is provided with reinforcement ribs.

As a further improvement of the present invention, wherein the fixed frame comprises several fixed rods arranged on the flat plate, the several fixed rods are connected end-to-end around the periphery of the flat plate.

As a further improvement of the present invention, wherein the method comprising the following steps:

S1. Pasting tin foil paper to the front and rear end caps of tank container, using sealing glue to adhere to the contact surface of the end cap and tin foil paper, extending the tin foil paper towards the inside of the neck ring;

S2. Placing a plastic film on the outer surface of the end cap, connecting the insulation foaming structure to both the end tank container frame;

S3. Providing a hole for injecting the foaming material at a position on the top of the neck ring, away from the weld seam;

S4. Calculating the time required to inject the foaming material based on the volume of the foaming space, the density of the insulation layer formed by foaming, and the pouring speed;

S5. Injecting the foaming material into the tank container insulation foaming structure;

S6. Performing the foaming for a preset time, and then removing the tank container insulation foaming structure;

S7. Checking the quality and appearance of the insulation layer;

S8. Installing fiberglass end cap outer plates on the insulation layer, uniforming the gap among the edges of the outer plates and frames at both ends, as well as the outer supports;

S9: Drilling rivet holes from the center of the straight edge of the outer plate towards the edges, enabling the outer panel free of waves and wrinkles;

S10: Using sealing glue to bond the outer plates to the tank container.

As a further improvement of the present invention, wherein in step S4, $t=(V\_body*\rho)/v\_speed$;

where t is the foaming space;

where V_body is Volume of the foaming space;

where $\rho$ is Density of the insulation layer;

where v_speed is Pouring speed.

As a further improvement of the present invention, wherein in step S4, when the room temperature is below 0° C., the pouring speed v_speed is 1.9 kg/s: when the room temperature is between 0° C. and 30° C., v_speed is 2 kg/s; and when the room temperature exceeds 30° C., v_speed is 2.1 kg/s.

As a further improvement of the present invention, wherein in step S2, before connecting the tank container insulation foaming structure to the end frames, a release agent is applied inside the foaming space of the insulation foaming structure.

As a further improvement of the present invention, wherein in step S5, the foaming material is a mixture of combined polyether and isocyanate.

As a further improvement of the present invention, wherein the ratio of combined polyether to isocyanate is 1:1.2.

As a further improvement of the present invention, wherein in step S6, at room temperatures above 20° C., the preset time is 90 minutes; at temperatures at or below 20° C., the preset time is 120 minutes.

The invention primarily designs an insulation foaming structure and method for tank containers. By setting up a press molding module to form a foaming space, the foaming material foams within this space, forming an insulation layer consistent in shape with the tank container end caps, thereby better insulating the tank container end caps. The clamping fixation module secures the press molding module and connects it to the tank container frame, preventing excessive reaction during foaming that could deform or displace the press molding module, ensuring effective foaming.

BRIEF DESCRIPTION OF THE FIGURES

The following detailed description of specific embodiments of the application will refer to the accompanying figures. It should be understood that the described embodiments are only for explaining the present application and do not limit the scope of the present application. In the attached figures.

Figure 1:
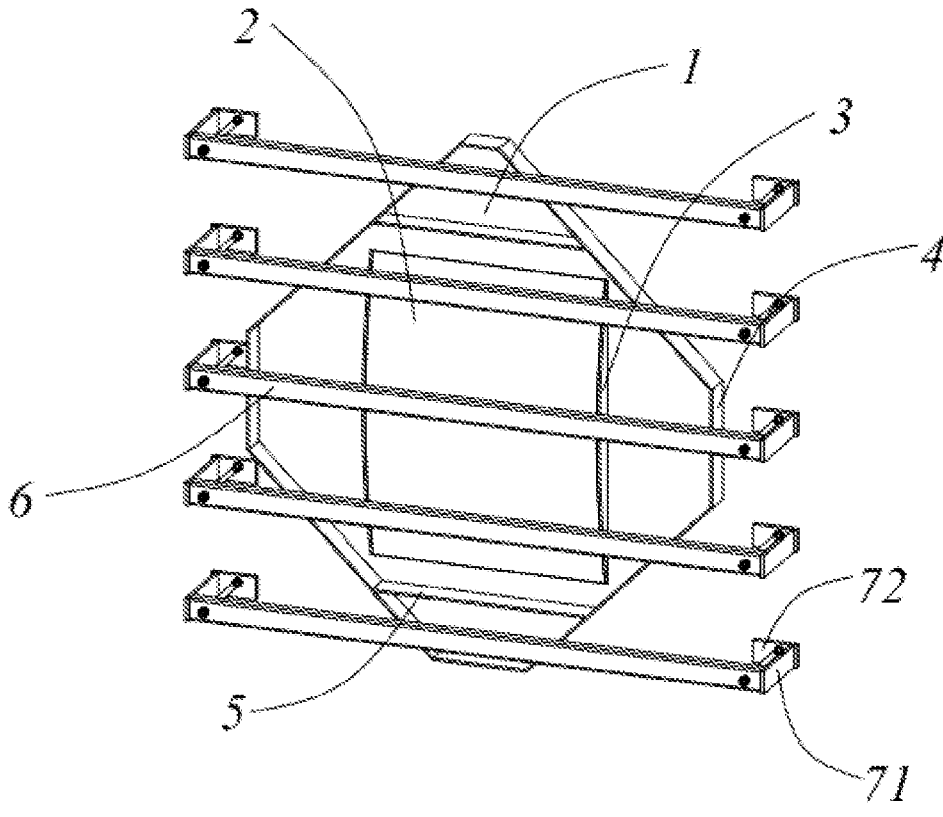
FIG. 1 is a perspective view of the present invention.

In the figures: 1. Flat plate; 2. Arc plate; 3. Connection plate; 4. Fixed frame; 5. Reinforcement ribs; 6. compression rod; 71. First plate; 72. Second plate; 8. Container frame; 9. Tank container; 10. Foaming space

DETAILED DESCRIPTION

In order to enable the objectives, technical solutions, and advantages of the present invention more clearer, the technical solutions in embodiments of the present invention will be described completely with reference to figures in the embodiments. In the figures, the same or similar reference numerals stand for the same or similar components or those with the same or similar functions throughout. The described embodiments are part of the embodiments of the invention, not all of them. The embodiments described with reference to the figures are exemplary, intended to explain the invention, and should not be construed as limiting the invention. All other embodiments obtained by those skilled in the art without creative efforts based on the embodiments in this invention fall within the scope of protection of the present invention.

In the description of the present invention, it is to be understood that the orientation or positional relationship indicated by the terms "centre", "longitudinal", "transverse", "front", "back", "left", "right", "vertical", "horizontal", "top", "bottom", "inside", "outside", etc. is based on that shown in the accompanying figures, and is only for the purpose of facilitating the description of the present invention and simplifying the description, and is not indicative of, or suggestive of, that a device or an element must be constructed and operated with a particular orientation, and is not to be construed as a limitation on the scope of protection of the present invention. The following detailed description of specific embodiments of the present invention in conjunction with the accompanying figures.

It should be understood that the accompanying figures are intended only for exemplary illustration of the present application.

Figure 2:
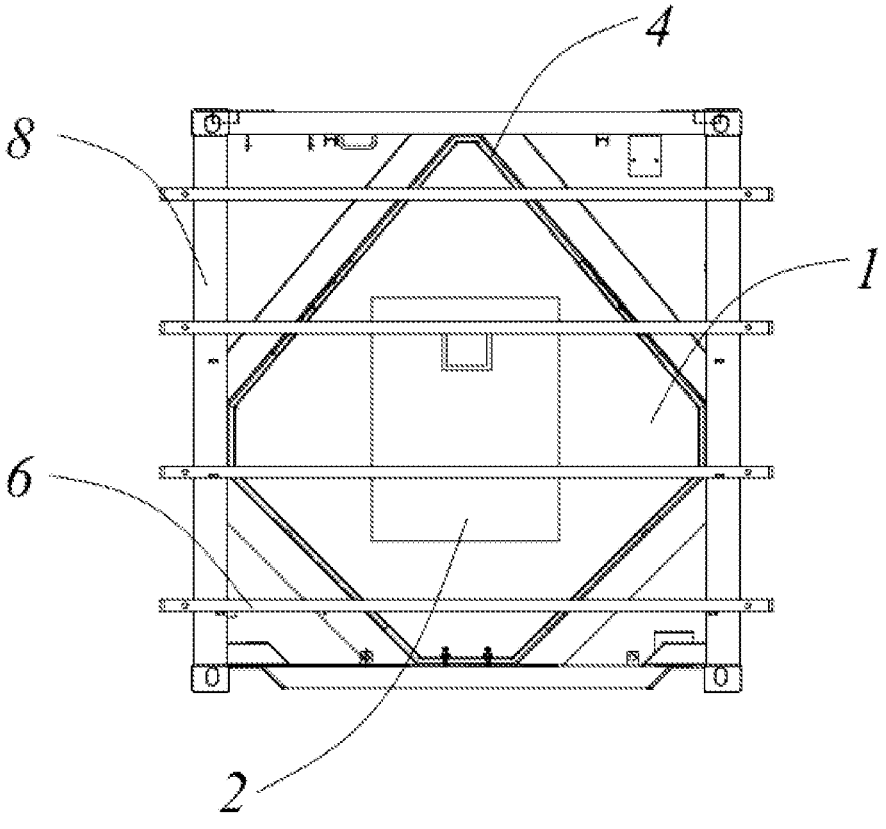
FIG. 2 is a front view of the present invention.
Figure 3:
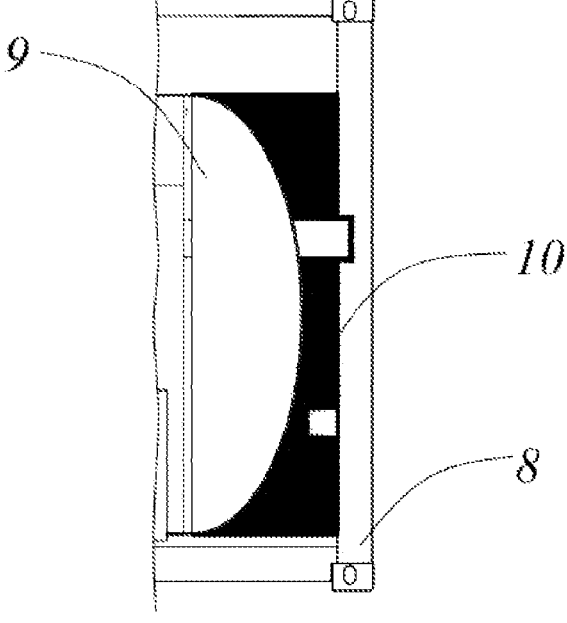
FIG. 3 is a schematic view of the foaming structure at the tank container end cap of the invention.

An insulation foaming structure for a tank container, as shown in FIGS. 1-3, includes a press molding module for foaming, and a clamping fixation module for securing the press molding module. The insulation foaming structure is connected to the end caps of the tank container 9 for the foaming operation.

The press molding module includes a flat plate 1 connected to the tank container 9, an arc plate 2 provided on the flat plate 1, and a connection plate 3 used to connect the flat plate 1 with the arc plate 2. A foaming space 10 is formed between the arc plate 2 and the tank container 9.

The flat plate 1 connects to the end caps of the tank container, and the flat plate 1 is set based on the structure of the end frames of the tank and the shape of an outer plate. The flat plate 1 is provided with connection holes for facilitating the setting of the arc plate 2, connection holes are designed to match the arc plate 2 and facilitates the setting of the arc plate 2. When the arc plate 2 is placed on the flat plate 1, there will be a portion that does not fully connect, leaving gaps where foaming cannot occur. Hence, the connection plate 3 is used to connect the flat plate 1 and the arc plate 2, facilitating foaming. After connecting the flat plate 1, the arc plate 2, and the connection plate 3, a sealed foaming space 10 is formed between the insulation foaming structure and the tank container end cap. The foaming material reacts in the space 10, forming an insulation layer. The layer fits tightly against the tank container end cap, ensuring the insulation effect of the tank container end cap. The setting of the flat plate 1 and the arc plate 2 is suitable for different types of tank container 9, ensuring that the formed insulation layer also fits various types of tank container 9, and provides effective insulation for the end caps.

The clamping fixation module includes a fixed frame 4 for securing the flat plate 1, a compression rod 6 for fastening the fixed frame 4, and connecting components that connect the compression rod 6 with the tank container 9.

The fixed frame 4 includes several fixed rods arranged around the flat plate 1, with the number of rods determined by the shape of the flat plate 1. Further, eight fixed rods are set, around the periphery of the flat plate 1 and connected end-to-end. These rods are all connected to the flat plate 1, with options for connection including gluing, welding, or integral molding. In the present embodiment, the fixed rods are welded onto the flat plate 1, providing support around the periphery of the flat plate 1. To prevent local deformation of the flat plate 1 due to pression during the foaming process, reinforcement ribs 5 are installed on the flat plate 1 to enhance the strength of the flat plate 1.

As the foaming material releases heat and causes volume expansion during the reaction process, it generates an outward impact force on the flat plate 1. If the press molding module undergoes plastic deformation, it will lead to the leakage of the foaming material, contaminating the paint. To further increase the strengthen of the press molding module, compression rods 6 are provided on the fixed frame 4. The number of compression rods 6 is determined by the size of the fixed frame 4, and the compression rods 6 are set parallel to each other and connected to the fixed frame 4. The connection can be by gluing, welding, or integral molding. In the present embodiment, the compression rods 6 are welded to the fixed frame 4, enhancing the strength of the press molding module and effectively preventing deformation during the foaming process. The length of the compression rods 6 is designed to ensure that, once connected to the connecting components, the compression rods 6 can be fixed to the frame of the tank container 9.

The connecting components include a first plate 71 connected to the compression rod 6 and a second plate 72 connected to the first plate 71. The first plate 71 is welded to the compression rod 6, and the first plate 71 is welded to the second plate 72. The tank container insulation foaming structure is connected to the tank container 9 by the second plate 72.

The tank container insulation foaming structure is hoisted onto the tank container 9 using a bridge crane. The compression rods 6 contact with the tank container frame 8. First bolt holes are provided on the compression rod 6, second bolt holes are provided on the tank container frame 8, and third bolt holes are provided on the second plate 72. Bolts are inserted sequentially through the first, second, and third bolt holes, connecting the compression rod 6, tank container frame 8, and the second plate 72. This arrangement secures the tank container insulation foaming structure onto the tank container 9.

The specific installation steps for the tank container insulation foaming structure are as follows:

Connect the arc plate 2 with the flat plate 1, and the connection plate 3 connects the arc plate 2 and flat plate 1, creating a closed foaming space 10 between the flat plate 1, arc plate 2, connection plate 3, and the tank container 9. Arrange several fixed rods around the periphery of the flat plate 1. These rods are connected end-to-end to form a fixed frame 4, which is then connected to the flat plate 1 to provide support. Providing the reinforcement ribs 5 on the flat plate 1 to increase the strength of the flat plate 1. Connect the compression rods 6 to the fixed frame 4, connect the first plate 71 to the compression rods 6, and then connect the second plate 72 to the first plate 71, completing the installation of the tank container insulation foaming structure. Once the insulation foaming structure is assembled, use a bridge crane to hoist and position the tank container insulation foaming structure on the tank container 9. Then, connect and secure the thermal insulation foaming structure to the tank container frame 8 by bolts. After completing the connections, inject the foaming material into the foaming space 10 to start the foaming process.

A tank container insulation foaming method, comprising the following steps:

S1: Cleaning the end caps on both ends of the tank container 9. Then, pasting tin foil paper to the front and rear end caps of tank container 9. Using sealing glue to adhere to the contact surface of the end caps and the tin foil paper. Extending the tin foil paper as far as possible towards the inside of a neck ring and to ensure it is firmly attached.

The tin foil paper, which is not removed after the foaming process, can prevent high temperatures and block condensation water, thus protecting the foaming material.

S2: Placing a plastic film over the outer surface of both end caps, wrapping the tank container end caps as completely as possible. Using a bridge crane to lift the tank container insulation foaming structure. Applying a release agent inside the foaming space 10 of the structure, then using the bridge crane to move the tank container insulation foaming structure to frames at both ends. Connecting the insulation foaming structure to the tank container frame 8 by bolts.

The purpose of setting the plastic film and release agent is to facilitate the subsequent disassembly of the tank container insulation foaming structure. The plastic film and release agent can be used individually. However, if only the plastic film is used, it may easily be damaged during the foaming process, causing the foaming material to leak out and adhere to the thermal insulation foaming structure, resulting in contamination. Therefore, the plastic film would need to be frequently replaced, leading to waste and increased cost. Conversely, if only the release agent is used, it being a liquid, can flow from the upper part to the lower part of the foaming space 10 before it dries completely. This can result in the upper part not being well-coated with the release agent, leading to inadequate release of the upper part of the tank container insulation foaming structure. Waiting for the release agent to dry completely before installing the thermal insulation foaming structure can still result in the foaming material adhering to the structure, making it difficult to demold.

S3: Providing a hole for injecting the foaming material at a position on the top of the neck ring, away from the weld seam. The size of the foaming injection hole should match the injection port of the foaming machine. Moving the foaming machine to the injection hole to inject the foaming material into the foaming space.

S4: Calculating the time required to inject the foaming material based on the volume of the foaming space, the density of the insulation layer formed by foaming, and the pouring speed:

Volume of the foaming space; V_body

Density of the insulation layer; $\rho$

Pouring speed: v_speed

Time for injecting the foaming material: t

Weight of the foaming material: m

Since m=V_body*$\rho$, and t=m/v, it follows that t=(V_body*$\rho$)/v_speed.

The pouring speed is determined based on room temperature, with specific pouring speeds as follows:

If room temperature is below 0° C., v_speed=1.9 kg/s

If room temperature is between 0° C. and 30° C., v_speed=2 kg/s

If room temperature is above 30° C., v_speed=2.1 kg/s

For example, using 3D software, after pressing the tank container insulation foaming structure, the volume of the foaming space 10, V_body, is calculated as 0.8 m³. To achieve an insulation layer density of $\rho$=42 kg/m³, the total weight of foaming material m needed is 33.6 kg. With a pouring speed v_speed of 2 kg/s, the required time t is calculated to be 16.8 s.

The higher the density of the insulation layer, the better the insulation effect, and the faster the pouring speed into the foaming space 10. The lower the density of the insulation layer, the poorer insulation effect, and the slower the pouring speed into the foaming space 10.

If the pouring speed is too fast, the foaming material at the bottom may not have reacted before new material is poured in. As the foaming material at the bottom reacts and expands, it continuously accumulates upwards and leaks out, contaminating the tank body and affecting the flowability of the poured material. Additionally, controlling density becomes challenging at high pouring speeds. Conversely, if the pouring speed is too slow, the foaming material at the bottom has already reacted before new material is poured in, resulting in ineffective foaming.

The pouring speed at higher room temperatures is slower compared to that at lower temperatures. With the volume of the foaming space and pouring density determined, a faster pouring speed means a shorter time for injecting the foaming material.

S5: Injecting the foaming material into the tank container insulation foaming structure. The foaming material is a mixture of combined polyether and isocyanate, mixed in a ratio of 1:1.2. Calculating the required amounts of combined polyether and isocyanate based on the quantity of foaming material needed.

S6: Performing the foaming to rest for 90 minutes at room temperatures above 20° C., and for 120 minutes at temperatures below 20° C. After the foaming process is complete, removing the tank container insulation foaming structure.

S7: Checking the quality and appearance of the insulation layer to ensure it is free of damage or flaws, thereby guaranteeing the insulation effectiveness for the tank container.

S8: Installing fiberglass end cap outer plates on the insulation layer, ensuring the surface of the outer plates is defect-free. After marking and cutting the plates, make sure the edges are straight and free of burrs or flash. The gap among the edges of the outer plates and frames at both ends, as well as the outer supports, should be uniform.

S9: Drilling rivet holes from the center of the straight edge of the outer plate towards the edges. The outer plate should have no waves or wrinkles. The rivet holes are used to fix the outer plate to the insulation layer on the tank container, preventing the outer plate from falling off during transport, which could damage the insulation layer and affect the insulation of the tank container end caps.

S10: Using sealing glue to bond the outer plates to the tank container end caps. If only rivets are used, the outer plates may not fully cover the insulation layer, leaving it partially exposed and prone to damage. Therefore, sealing glue is used to ensure the outer plates completely cover the insulation layer, protecting it from damage.

The primary objective of the present invention is to design a tank container insulation foaming structure and method. By establishing a press molding module, a foaming space 10 is formed, where the foaming material expands to create an insulation layer. This layer matches the shape of the tank container end caps, providing enhanced insulation. The clamping fixation module secures the press molding module and connects the press molding module to the tank container frame 8, preventing excessive reaction during the foaming process which could deform or displace the press molding module, thus ensuring an effective foaming reaction. The foaming of the tank container end caps according to the tank container insulation foaming structure, compared to the prior arts, involves simpler steps and achieves superior results. The formed insulation layer meets the required specifications.

The preferred embodiments of the present invention are described in detail above in conjunction with the accompanying figures, however, the present invention is not limited to the specific details in the above embodiments, and a variety of simple variations of the technical solution of the present invention can be carried out within the technical conception of the present invention, and all of these simple variations fall within the scope of protection of the present invention.

It is also to be noted that the various specific technical features described in the above specific embodiments may be combined in any suitable manner without contradiction, and in order to avoid unnecessary repetition, the present invention does not separately describe the various possible combinations.

In addition, the various different embodiments of the present invention can also be combined in any way, and as long as they do not contradict the idea of the present invention, they should likewise be regarded as the contents disclosed in the present invention.

The invention claimed is:

1. A tank container insulation foaming method comprising the following steps:

providing an apparatus for forming a tank container insulation foaming material, the apparatus comprising:

a press molding module for foaming; and a clamping fixation module for securing the press molding module;

wherein the press molding module comprises a flat plate that connects with the tank container, an arc plate provided on the flat plate, and a connection plate used to connect the flat plate with the arc plate, wherein a foaming space is formed between the arc plate and the tank container; and wherein the clamping fixation module comprises a fixed frame for securing the flat plate, a compression rod for fastening the fixed frame, and connecting components that connect the compression rod with the tank container; and thereafter (S1) pasting tin foil paper to a front end cap and a rear end cap of the tank container, using a sealing glue to adhere to respective contact surface of the front and rear end caps and the tin foil paper, extending the tin foil paper towards an inside of a neck ring of the tank container;

(S2) placing a plastic film on an outer surface of the front and rear end caps, connecting the apparatus to both end frames of the tank container;

(S3) providing a hole for injecting the foaming material at a position on a top of the neck ring away from a weld seam of the tank container;

(S4) calculating a time required to inject the foaming material based on a volume of the foaming space, a density of an insulation layer to be formed by foaming, and a predetermined pouring speed;

(S5) injecting the foaming material into the apparatus;

(S6) performing foaming for a preset time, and then removing the apparatus;

(S7) checking a quality and an appearance of the insulation layer;

(S8) installing fiberglass end cap outer plates on the insulation layer, uniforming gaps among edges of the outer plates, the end frames of the tank container, and outer supports of the tank container;

(S9) drilling rivet holes from a center of a straight edge of each outer plate toward edges of the same outer plate to enable the outer plate to be free of waves and wrinkles;

(S10) using the sealing glue to bond the outer plates to the tank container.

2. The tank container insulation foaming method according to claim 1, wherein in step S4, $t=(V\_body*\rho)/v\_speed$;

where t is the time required to inject the foaming material;

where V_body is the volume of the foaming space;

where $\rho$ is the density of the insulation layer;

where v_speed is the predetermined pouring speed.

3. The tank container insulation foaming method according to claim 2, wherein in step S4, when the room temperature is below 0° C., the v_speed is 1.9 kg/s; when a room temperature is between 0° C. and 30° C., the v_speed is 2 kg/s; and when the room temperature exceeds 30° C., the v_speed is 2.1 kg/s.

4. The tank container insulation foaming method according to claim 1, wherein in step S2, before connecting the apparatus to the end frames of the tank container, a release agent is applied inside the foaming space of the apparatus.

5. The tank container insulation foaming method according to claim 1, wherein in step S5, the foaming material is a mixture of combined polyether and isocyanate.

6. The tank container insulation foaming method according to claim 5, wherein a ratio of combined polyether to isocyanate is 1:1.2.

7. The tank container insulation foaming method according to claim 1, wherein in step S6, at room temperatures above 20° C., the preset time is 90 minutes; at temperatures at or below 20° C., the preset time is 120 minutes.

\* \* \* \* \*